No Printed Specification Available
9434X
M. Mathew.
Boot Tree.
Patented Feb. 25 1836.
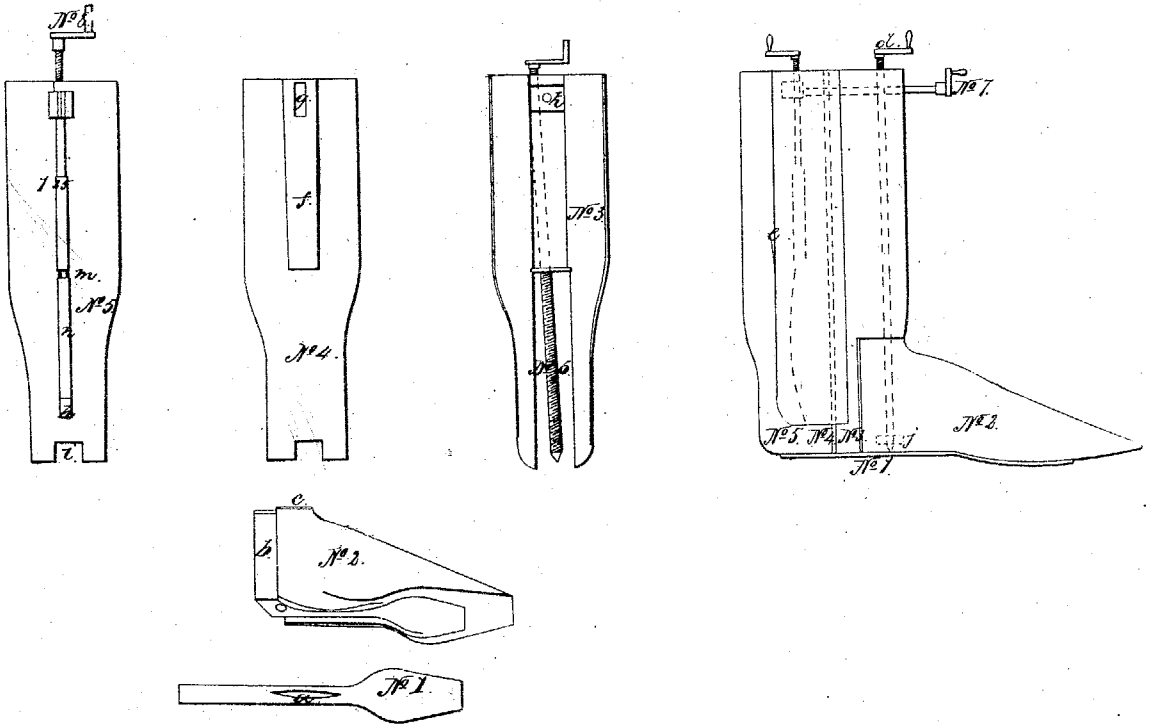

Feb 25. 1836

45.

Mathew Mathews of the County of Wayne. Ohio

Letters Patent

The schedule referred to in these Letters Patent and making
part of the same, containing a description in the words of
the said Mathew Mathews himself of his Improvement in
the expanding boot tree, ——

To all to whom these presents shall come,
Be it known that I Mathew Mathews of the County
of Wayne and State of Ohio have invented a new and useful
improvement in the boot tree and the following is a full
and exact description of the construction and operation of
the Boot-tree as improved by me, 1st The tree is made to
consist of eight pieces, viz. No 1, Is an iron shank tapered
from the widest place on the ball to an edge, the shank
is let into No 2, even with the surface passing through
No 3 and [illegible] into nearly through No 5, leaving a shoulder
the shank is seven inches long, two inches in width on the
ball, one half inch in thickness and after passing the ball
one inch in thickness with a groove two inches in length, one
fifth of an inch in depth to receive the point of a perpendi
cular screw, denominated the shin screw for the purpose
of raising the boot on the instep No 3 The foot is dovetailed
into No 3, by an upright dovetail on the upper side of No 3,
is a plate of brass or copper made to fit a similar piece on
No 3. No 2 The shin is a piece of wood made in the form of a leg
with from the top to the middle of the shin on each side
of No 3. is attached a piece of brass to cover the vacancy
made by the wedge No 4 is a key introduced into No 3
by a tongue extending within [illegible] width of the foot at the
upper [illegible] of the key [illegible] a mortise made through the tongue
[illegible] length [illegible] to receive a screw No. 5, the back piece or calf is a piece of wood made
in the form of a half circle as far as the middle of the calf con-
taining a groove to receive a screw and wedge the groove is one
and one fifth inch in depth, three fifths of an inch in width
varying [illegible] the surface at the lower end, at the upper end of
No. 5 is a mortice one and one half inch in length one and
one fifth inch in width the same in depth at the lower end
of No. 5 is a mortice one half an inch in depth and one
inch in width to receive the end of No. 1 No. 6. The
perpendicular screw passing through No. 3 and No. 2,
its point operating in the groove of No. 1, Near the end on
the bottom of No. 2. is a brass or iron nut, one and one half
inch in length and of sufficient thickness to receive a screw
one half an inch in diameter passing through the said nut
acting on No. 1, to raise the instep No. 7. The horizontal
screw three eighths of an inch in diameter passing through
No. 3 and through a brass or iron nut, inserted in
No. 3, and through one or more keys its point or extremity
acting on a groove [illegible] which is attached to No. 8 for the
purpose of increasing the size of the Boot at the top No. 8
is a perpendicular screw eleven inches in length five eights
of an inch in thickness containing a groove nut which nut is
one and one half in length one and one fourth inch in
width and one and one fifth inch in depth to receive No. 7.
There is attached to the extremity of No. 8 a joint pointed
with steel inserted in a square bar pointed with steel
with a female [illegible] attached to prevent the screw from
separating from the bar, and at the same time to [illegible]
constituting a circular joint, The wedge is one and
three fifth inches in length and one eighth of an inch in
width and three fourths of an inch in thickness from the
centre verging to a point downward [illegible] from the
centre the wedge is made [illegible] the end of the

9434 X bar to which it is united by the point, the bar is one and three
fourth inches in length, the extreme end of the bar, is a semicircle
with a tongue made to fit the upper end of the wedge Operation
The respective No.s of the boot tree are inserted into the Boot
the facility by which the instep is raised by the turning of
No. 6 is appreciated by those only who have tested its
utility No. 8 the screw and wedge increases the Boot in size
at the lower end No. 7 increases the size of the boot at
the top. thus the necessity of hammering or defacing the
work, is dispensed with in a manner satisfactory to those
who have witnessed the operation — Invention Claimed
I claim as my invention the peculiar form and construc
tion of the Boot Tree, as above described 1st the perpen
dicular screw, 2nd the horizontal screw 3d. the screw
and wedge 4th the plate of brass 5th the iron shank
and dovetail groove all the above discoveries or improve
ments are depended upon together with the privilege
of varying the proportions or materials as may best suit
my fancy so that I depart not from the principles therein
set forth —

Witnesses
S. M. Schrecker
D. N. Sprague

Mathew Mathews

996 [illegible]

Ex?
CHW

Drawn